Figure 4:
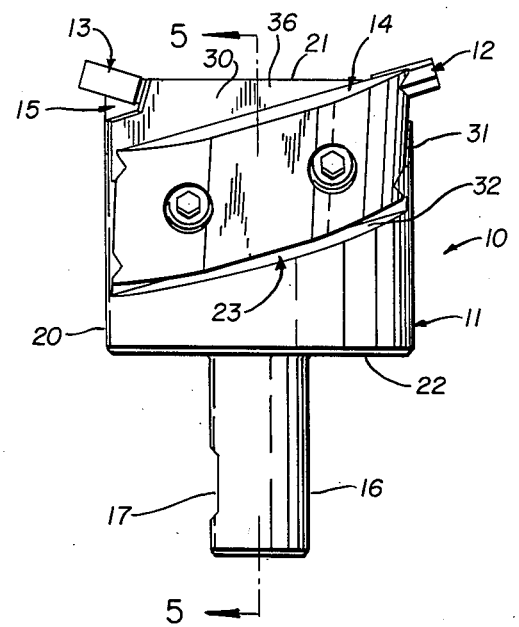

May 29, 1962 R. E. NOVKOV 3,036,363
FACE MILL CUTTER
Filed June 5, 1957 2 Sheets-Sheet 1
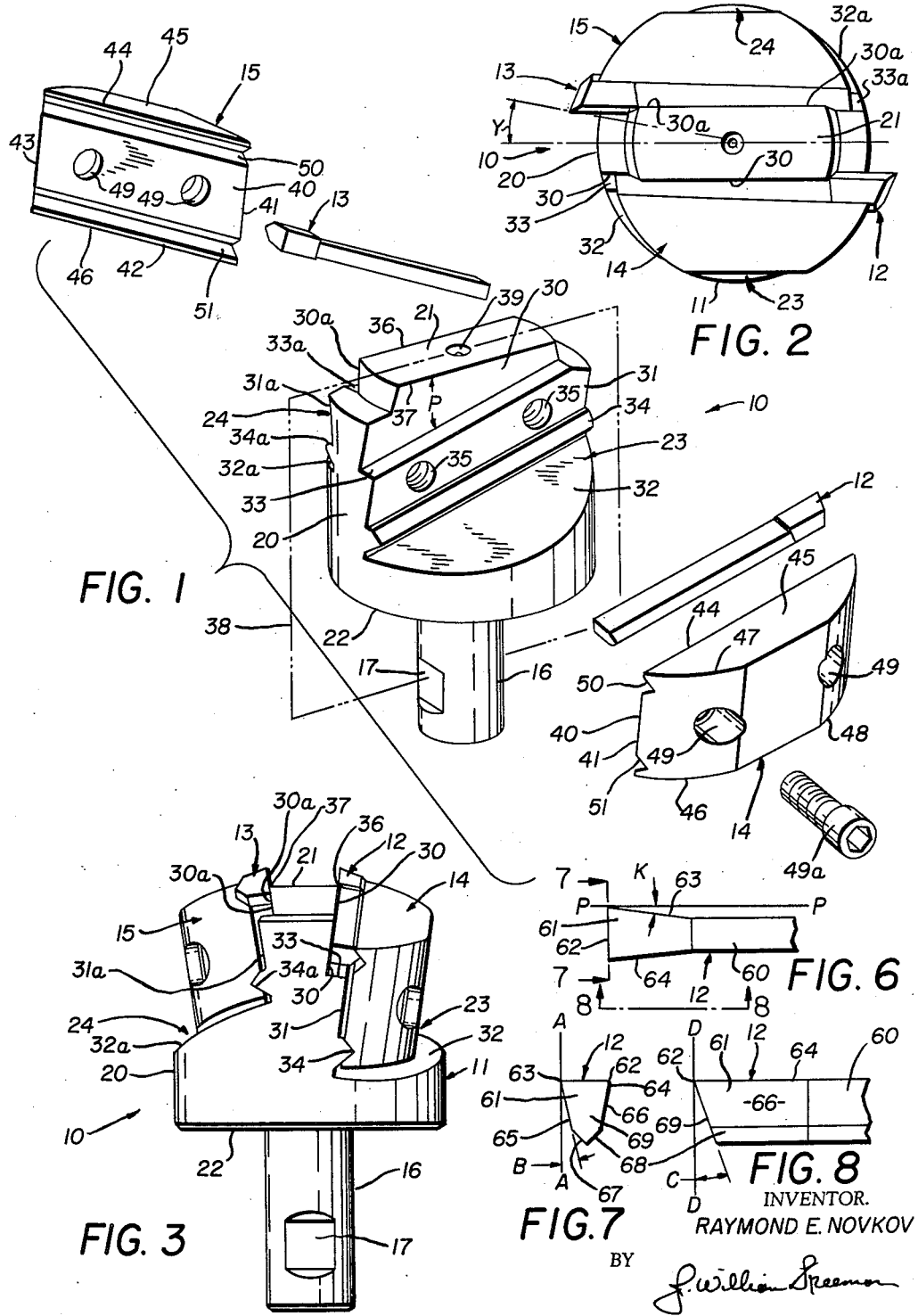
INVENTOR.
RAYMOND E. NOVKOV
BY
J. William Freeman
ATTORNEY May 29, 1962 — R. E. NOVKOV — 3,036,363
FACE MILL CUTTER
Filed June 5, 1957 — 2 Sheets-Sheet 2

INVENTOR.
RAYMOND E. NOVKOV
BY
William Freeman
ATTORNEY

United States Patent Office 3,036,363
Patented May 29, 1962

3,036,363
FACE MILL CUTTER
Raymond E. Novkov, Akron, Ohio, assignor to Manchester Machine & Tool Company, Akron, Ohio, a corporation of Ohio
Filed June 5, 1957, Ser. No. 663,653
3 Claims. (Cl. 29—105)

This invention relates to rotatable cutting devices, and in particular, has reference to a new and improved type of face mill cutters.

In the known prior art of cutting tools, and particularly face mill cutters, it has long been known that a plurality of cutting bits can be arranged about a common axis of rotation so as to effectuate a cutting action upon relative movement of the work with respect to the revolving cutter.

In actual practice, a representative use of a face mill cutter is in connection with a milling machine, for example, wherein the cutter is rotated by the machine spindle while the work piece is secured to a movable work slide so that upon relative movement of the work piece into the revolving cutter, a layer of metal will be removed from the work piece to form a smooth surface thereon.

It has been found in other applications involving cutting tools that if the cutting bit is angled with respect to the work it contacts, a higher degree of cutting efficiency will be obtained, and similarly, that a greater degree of cutting life will inure to the cutting bit. Adjustment of this type involves careful selection of the various rake angles, such as side and front rake angles. Representative of the cutting bits employed in this regard are certain cutting bits disclosed in co-pending application, Serial No. 505,488, of Raymond E. Novkov et al., filed May 2, 1955, now Patent No. 2,846,756 issued Aug. 12, 1958.

It has long been desired to incorporate a cutting bit of this type with a circular work holder so as to provide a face mill cutter for use with a milling machine of the type above described. However, to the present time, attempts in this regard have been unsuccessful due to the fact that considerable difficulty was invariably encountered with regard to the setting of the individual cutting bits. In this regard, it is, of course, mandatory to attain equal cutting impact on the individual cutting bits so that the same will remove equal amounts of metal. Accordingly, it has been found that these cutting bits must have their respective cutting edges equi-distant from the axis of rotation. As a practical matter, however, it has been found that in the invariable sharpening and grinding operations that accompany use of such tools, it was often found to be difficult and highly impractical to take the time required to effectuate such resetting operations, with the result that the commercial acceptance of such types of tools has been minimized at the present time.

It has been further found that if an insert type of cutting bit is provided for use on a preset supporting surface that is incorporated in the holder per se, that improved results will occur due to the fact that the individual component bit members can be easily and quickly removed, sharpened, replaced and reset with a minimum amount of difficulty. It has been further found that by making the cutting bits uniform and by resting the same on a guideway of certain angular disposition with respect to the axis of rotation, that a compound angle arrangement of the cutting edge can be achieved to greatly ease the cutting shock or impact between the bit and the work.

In actual practice, it has been found that the most effective results can be obtained by employing a bit-receiving surface that is disposed on a compound angle with respect to the axis of rotation. Use of such a surface will operate to automatically position the cutting edge of the supported bit at certain radial and axial rake angles, with a negative axial rake of 10° and a positive radial rake of 15° being employed with satisfactory results. A cutting tool of this general classification has been found to possess several advantages.

First, it has been found that by use of cutting bits set at compound angles as above described, that hardened tool steel can be cut with a very high rate of feed, with the result that the milling operation can be quickly performed by unskilled help.

Secondly, it has also been found that by releasably clamping these individual cutting bits to the holder by readily releasable clamping blocks, that the cutting shock is absorbed by the removable block itself, thus minimizing the possibility of damage or injury to the holder member. As a third advantage, it has also been found that the construction illustrated hereinafter in the preferred embodiment of the invention, lends itself to having the clamping blocks being interchangeable, with such interchangeability being achieved by the provision of parallel grooves on one face of the clamping block and with these grooves respectively engaging the holder and the V-shaped undersurface of the cutting bit.

As a still further advantage of this preferred form of the face mill cutter, it has been further found that a certain degree of radial adjustment can be achieved to facilitate usage over a wider range.

It accordingly becomes the principal object of this invention to provide a milling cutter having a plurality of cutting bits that have their respective cutting edges disposed at compound angles with respect to the axis of rotation of the cutter holder and which are characterized by the fact that the same are capable of being easily removed for resharpening, at a non-compounded angle relative to the bit itself, and which, upon such resharpening, are capable of being quickly and precisely reset in the cutter without the use of precision measuring equipment.

It is a still further object of this invention to provide a milling cutter of the type above described, characterized by the fact that the cutting bits thereof can be removed and reset at a proper angle about the axis of rotation with a minimal amount of error wherein the cutting edges are constantly maintained equi-distant about the axis of rotation.

These and other objects of the invention will become more apparent upon a reading of the following brief specification considered and interpreted in the light of the accompanying drawings.

Figure 9:
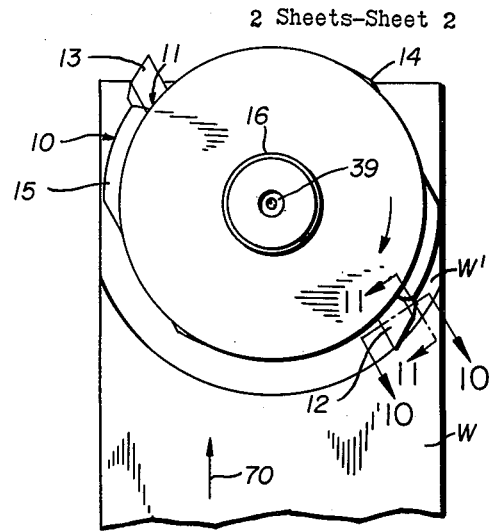
Figure 10:
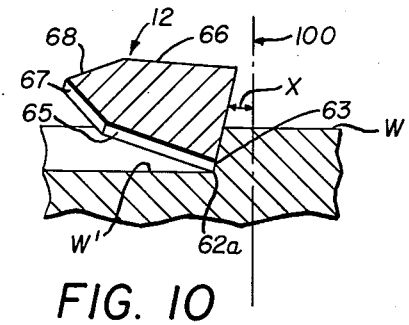
Figure 11:
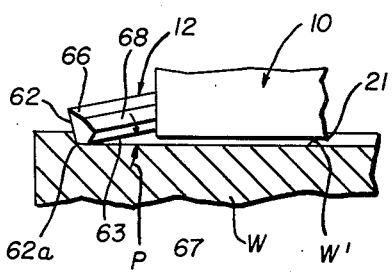
Figure 5:
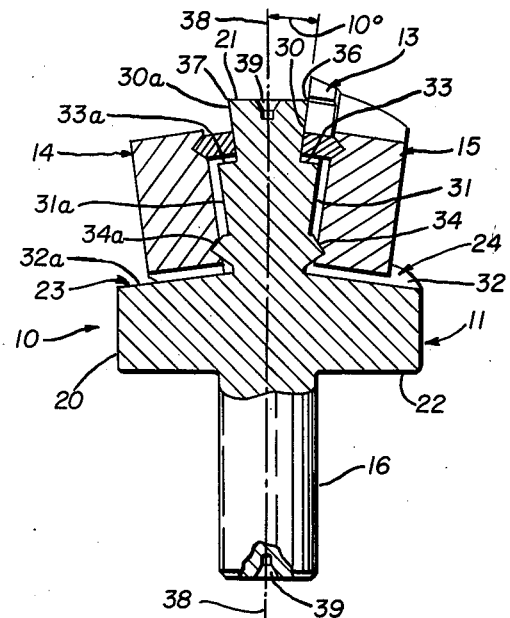

Of the drawings:
FIGURE 1 is an exploded perspective view illustrating the component parts of the cutter.
FIGURE 2 is an end view of the assembled cutter.
FIGURE 3 is an elevational view of the assembled cutter.
FIGURE 4 is a similar elevational view of the assembled cutter taken at 90° from FIGURE 3.
FIGURE 5 is a section taken on the lines 5,5 of FIGURE 4.
FIGURE 6 is a plan view of the insert bit.
FIGURES 7 and 8 are views taken on the lines 7,7 and 8, 8 of FIGURE 6.
FIGURE 9 is a schematic plan view showing the holder and cutters engaging a work piece.
FIGURES 10 and 11 are enlarged views showing the position of the cutting bit as indicated by the lines 10, 10 and 11, 11 of FIGURE 9.

Referring now to the drawings, and in particular to FIGURES 1 to 5 thereof, the improved milling cutter, generally designated by the numeral 10, is shown including a contoured head unit 11 that receives, on appropriate surfaces thereof, cutting bits 12 and 13, with these cutting bits 12 and 13 being retained on head unit 11 by clamping blocks 14 and 15 that are preferably identical in configuration. To facilitate use in the spindle of a milling machine (not shown), the head unit 11 also defines a concentric shaft 16, flatted as at 17, for coaction with the usual set screw that may be provided on the machine spindle (not shown).

In order that the device might be better understood, the structure of the component parts will be separately described, as will the over-all cutting action.

The Head Unit

The head unit 11 is best shown in FIGURES 1 to 5 of the drawings, and as previously indicated, the same supports cutting bits 12 and 13 thereon so that upon rotation of head unit 11, the bits may effectuate a milling cut on a work piece W that moves relatively thereof. (See FIGURE 9.)

In general outline configuration, the head unit 11 is cylindrical in contour so as to be defined by an external cylindrical surface 20 and perpendicular end surfaces 21 and 22; the arrangement being such that these surfaces 21 and 22 are interrupted by contoured undercut areas, indicated generally by the numerals 23 and 24, with these undercut areas 23 and 24 accommodating the cutting bits 12 and 13 and clamping blocks 14 and 15 respectively, as clearly shown in the assembled drawings of FIGURES 2, 3, 4 and 5.

In general, the configuration of the undercut areas 23 and 24 are identical so as to facilitate interchanging of the bits and clamping blocks, and accordingly, a detailed description of only the undercut area 23 will be set forth, it being understood that the corresponding surfaces of the undercut area 24 are equivalent and are accordingly designated by the same numeral followed by an *a*. Thus, for example, surfaces 30 and 30a of undercut areas 23 and 24 will be equivalent.

Accordingly, and now referring to FIGURE 1 of the drawings, the undercut area 23 is shown including a bit-receiving surface 30, a clamping block surface 31, and an end surface 32, with the bit-receiving surface 30 and the clamping block surface 31 being substantially parallel, while the surface 32 is disposed substantially normal thereto as will more fully be described in ensuing paragraphs. Additionally, the surfaces 30 and 31 are shown interconnected by a surface 33, while a V-shaped projecting rib 34 extends transversely of surface 31, preferably in parallelism with surface 33 for coaction with the clamping block 14, as will presently be described.

Also, and to facilitate clamping of the bits, tapped apertures 35, 35 are provided in the surface 31 for the purpose of releasably securing the clamping block 14 with respect thereto, as will be apparent from an examination of FIGURE 4 of the drawings.

Because the surface 30 determines the angular disposition of the cutting bit 12 with respect to the axis of rotation and accordingly determine the radial and axial rakes obtained, some detailed consideration will be now given to the planar location of the bit-receiving surface 30. In this regard, it will first be assumed that the edge surfaces 36 and 37 are parallel, and further, that the same are equi-distant about a vertical plane indicated in phantom lines by the numeral 38 in FIGURE 1 of the drawings.

Using the aforementioned plane 38 as a locating point, it will be seen particularly from FIGURE 5 that the surfaces 30 and 30a have their planar configuration inclined with respect to the plane 38 so that the edges 36 and 37 are further disposed from this imaginary plane than is a point located on the surfaces 30 and 30a adjacent the point of juncture with the wall sections 33 and 33a. This provides a negative axial rake for a bit supported on surface 30 or 30a.

In addition, the surfaces 33 and 33a are also shown as being disposed out of parallel by angle P, with respect to end surface 21, and thus a face cutting clearance (see FIGURE 11) is provided. Also in view of the fact that the individual bits are received against the surfaces 30 and 30a in parallelism with surfaces 33 and 33a. It will be apparent that the bit members will be disposed at an angle with respect to both the end surface 21 as well as plane 38; thus it will be seen that the individual bits are, in reality, disposed at compound angles with respect to perpendicular planes that pass through the axis of rotation.

Also, because the edge portion defined by the juncture of surfaces 21 and 30 is located at a radial distance from the axis of rotation, a bit received on surfaces 30 and 30a as shown in FIGURE 2, will have a positive radial rake angle Y due to the fact that a line from the axis of rotation to the cutting edge 62 does not pass through the cutting bit.

While the surfaces 31 and 31a have been generally designated as clamping block surfaces for the sake of clarity of description, it is to be noted that the clamping blocks 14 and 15 do not, in actuality, come in contact with these surfaces, since the same are suspended therefrom by the bits and the V-shaped ribs 34, 34a in each case, as is clearly shown in FIGURES 3 and 5 of the drawings. Similarly, the end surfaces 32 and 32a are normally out of contact with the clamping blocks 14 and 15 respectively, as is best shown in FIGURE 5 of the drawings, with the general plane of the surfaces 32 and 32a being substantially parallel to the plane of surfaces 33 and 33a respectively so as to dispose the cutting blocks at an acute angle with respect to a plane that passes through the end surface 21. (See FIGURE 4.) For the sake of convenience in manufacture, centering holes 39, 39 may be provided on the opposed axial ends of the head unit 11.

The Clamping Blocks 14 and 15

As previously indicated, the clamping blocks 14 and 15 are preferably identical in configuration so as to facilitate interchangeable use thereof in connection with either of the two cutting bits illustrated in the preferred embodiment of the invention.

More specifically, each clamping block includes a flat planar surface 40, having the outline configuration of a parallelogram so as to define edge surfaces 41, 42, 43 and 44 with edge surfaces 41 and 43 being parallel as are edge surfaces 42 and 44. Also, and as best shown by examination of clamping block designated as 14 in FIGURE 1 of the drawings, each clamping block includes parallel side surfaces 45 and 46 with the edge portions 42 and 44 defining one edge of these side surfaces while the remaining edges are contoured as at 47 and 48 so as to give the overall clamping block an arcuate cross-sectional configuration. Apertures 49, 49 pass through the clamping blocks 14 and 15 in each case and enter the surface 40 thereof for coaction with the previously described tapped apertures 35, 35, with machine screws 49a, 49a being conveniently employed to facilitate this clamping.

In addition to the aforementioned component parts, the planar surface 40 is additionally shown as including a pair of V-shaped grooves indicated by the numerals 50 and 51, and which extend transversely of the surface 40 between edge portions 41 and 43, with these grooves 50 and 51 being located adjacent edge surfaces 42 and 44 for co-action with the bit and rib member 34 as will be presently described. It is to be understood that the remaining clamping block is of similar configuration in the preferred embodiment of the invention.

The Insert Bit

Once again, the construction of the insert bits 12 and 13 is preferably such that the same are identical in configuration so as to facilitate interchangeability thereof. Accordingly, only one cutting bit 12 will be described with it being understood that equivalent numerals applied to the remaining cutting bit 13 indicate equivalent construction.

Accordingly, and referring now to FIGURES 6, 7, and 8 of the drawings, the cutting bit 12 is shown including a shank portion 60 and a cutting head portion 61 that are preferably longitudinally abutted together as by brazing in the manner set forth in co-pending application, Serial No. 505,488, of Raymond E. Novkov, filed May 2, 1955.

Accordingly, and as shown in the plan view of FIGURE 6, the head portion 61, which preferably is of carbide tool steel, defines a cutting edge 62, as well as flaring side edges 63 and 64, with these edges being disposed an angle K to a plane P—P that is normal to the cutting edge 62. In this manner, side clearance is provided in the area of edges 63 and 64. Similarly, the actual side surfaces 65 and 66 of the cutting head 61 are shown tapering inwardly with respect to plane A—A (FIGURE 7) so as to define a side clearance indicated by the letter B. Similarly, and as shown in FIGURE 8, the side surfaces 65 and 66 connect with adjacent surfaces 67 and 68 that coact together to define a V-shaped edge receivable within the groove of the clamping block members 14 and 15. Additionally, the cutting edge 62 is shown in FIGURE 8 as being the forwardmost point of the cutting head 61 with the leading surface 69 tapering rearwardly so as to define a front clearance angle C that exists between a plane D—D and the surface 69, and in this manner, adequate front clearance is provided for chip removal.

*Operation of the Device*

In considering the overall operation of the device, it will first be assumed that the component parts have been assembled as shown in FIGURES 2, 3, 4 and 5, with the cutting edges 62, 62 of insert bits 12 and 13 being equidistant about the axis of rotation as defined by centering holes 39, 39.

In order to carefully consider the actual cutting operation, reference is now made to FIGURES 9, 10 and 11 of the drawings, which are semi-schematic in nature so as to more clearly illustrate the cutting action.

Accordingly, in FIGURE 9, a work piece W is shown travelling in the direction of arrow 70 so as to, in effect, feed into the revolving cutter unit 10, and particularly the rotating insert bits 12 and 13 carried thereby. In FIGURE 9, the bit 12 is shown part-way through a circular cut and FIGURES 10 and 11 indicate the location of the cutting tool at the particular point of cut involved.

Accordingly, in FIGURE 10, which is a cross-sectional view looking radially outwardly, the insert bit 12 is shown as having the cutting edge 62 thereof engaged against the work W. Accordingly, the edge 63, together with the surface 65, is shown inclined with respect to the smooth, cut surface $W^1$ of the work. Similarly, the cutting edge 62 is inclined with respect to a plane that would be normal to surface $W^1$ so that the extreme cutting edge 62a thereof is making a point of contact with the surface $W^1$. In this manner, the cutting edge 62 is, in reality, inclined with respect to the axis of rotation as schematically illustrated by angle X in FIGURE 10 of the drawings, with angle X being between the cutting edge 62 and a plane 100 which latter plane 100 passes through and contains the axis of rotation. This arrangement provides negative axial rake on cutting edge 62. The preferred embodiment contemplates axial rake angle of —10°, although other rake angles could be used. As previously discussed, positive radial rake is obtained by the fact that the bit is radially disposed with respect to the axis of rotation. The surfaces 67 and 68 will, of course, be held in place by the clamping block but the position of the clamping block is not shown in this particular drawing for clarity.

In view of FIGURE 11, it is to be noted that the view is taken from behind the cutter bit looking at the rear of the same as it advances into the work, and accordingly, the edge 63 is shown inclined with respect to the work surface $W^1$ while the cutting edge surface 62 is similarly inclined with respect to a plane that is normal to the surface $W^1$ with the cutting bit 12 being held by a holder 10 as illustrated schematically in this figure.

It will be seen that as the cutting action occurs, the cutting edge 62 of each bit is, in reality, disposed at a compound angle with respect to certain critical surfaces of the head unit 11. In this regard, it is to be noted that the same is first angled with respect to the end surfaces 21 and 22 so that the cutting edge will be enabled to transmit the cutting shock through the longitudinal length of the individual insert bit.

Secondly, the cutting surface 62 is further inclined with respect to a plane tangential to the cylindrical surface 20. This positioning enables the cutting edge 62 (see FIGURE 10), to progressively be contacted by the work so as to avoid the complete contact between entire cutting edge and work as a result of this just-described positioning, with edge portion 62a being the trailing or last to contact portion of edge 62. Similarly, and considering next the third angle as best shown by the disposition of cutting surface 62 with respect to the work surface $W^1$ in FIGURE 10, it will be seen that the cutting edge 62 is inclined to provide an axial rake, while radial rake is provided as previously described.

It is believed apparent that as the tool wears and it is desired to sharpen the same that the clamping blocks 14 and 15 may easily be removed by loosening set screws 49, 49, at which time the insert bits may be re-sharpened with a minimum amount of difficulty due to the fact that it is not necessary to sharpen at any compound angle.

It will be seen from the foregoing that there has been provided a new and novel type of milling cutter characterized by the compound location of interchangeable cutting bits about an axis of rotation. It has been shown how this compound locating of the cutting bits permits a gradual entry of bit into work so as to minimize the cutting shock occurring upon contact between work and bit. It has further been shown how this compound locating of the cutting edge additionally serves to drive the chips downwardly so that the same may be, in effect, swept off by the revolving tool bit.

As a still further advantage of the invention, it has been shown how the component parts thereof are inter-changeable so as to facilitate easy repair and reuse of the same.

While a full and complete disclosure of the invention has been set forth in accordance with the dictates of the patent statutes, it is to be understood that the invention is not intended to be so limited, and it accordingly follows that modifications of the invention may be resorted to without departing from the spirit hereof or the scope of the appended claims.

This application is a continuation-in-part of co-pending application, Serial No. 505,488, filed May 2, 1955, by Raymond E. Novkov, now Patent No. 2,846,756 issued August 12, 1958.

What is claimed is:

1. A milling cutter of the character described, comprising; a tool body having an axis of rotation; a pair of bit-receiving planar surfaces defined by said tool body and extending transversely thereof on opposite sides of said axis of rotation; a pair of block-receiving surfaces, disposed adjacent to and in parallelism with said bit-receiving surfaces; a V-shaped rib member projecting from each said block-receiving surface and extending transversely thereof adjacent one edge portion; a pair of clamping blocks, each having a planar surface thereof provided with a transversely extending groove that is engageable on one said rib member whereby each said clamping block may be cantilevered on each said bit-receiving surface adjacent thereto; and means for drawing said overlying edge portions towards said bit-receiving surfaces adjacent thereto; said clamping block having a second parallel groove provided on the planar surface thereof and overlying said planar bit-receiving surface in spaced relationship therewith, whereby said clamping blocks may be reversed with respect to said ribs.

2. A milling cutter of the character described, comprising; a tool body having an axis of rotation; a pair of bit-receiving planar surfaces defined by said tool body and extending transversely thereof on opposite sides of said axis of rotation; a pair of block-receiving surfaces, disposed adjacent to and in parallelism with said bit-receiving surfaces; a V-shaped rib member projecting from each said block-receiving surface and extending transversely thereof adjacent one edge portion; a pair of clamping blocks, each having a planar surface thereof provided with a transversely extending groove that is engageable on one said rib member whereby each said clamping block may be cantilevered on each said bit-receiving surface adjacent thereto; and means for drawing said overlying edge portions towards said bit-receiving surfaces thereto; a pair of cutting bits received on said bit-receiving surfaces under said overlying edge portions and each having cutting edges disposed beyond the periphery of said body; and means for drawing said overlying edge portions towards said bit-receiving surfaces whereby said bits are clamped in place by said clamping blocks; said cutting edge lying substantially within the plane of said bit-receiving surface whereby the cutting force received by said bit will be absorbed by said clamping block.

3. The device of claim 2 further characterized by the fact that at least one said clamping block has a second parallel groove provided on the planar surface thereof whereby said clamping blocks may be reversibly interchanged with respect to said ribs and said bits.

References Cited in the file of this patent

UNITED STATES PATENTS

| | | |
|---|---|---|
| 893,239 | Gridley | July 14, 1908 |
| 976,775 | St. John | Nov. 22, 1910 |
| 2,310,992 | Proksa | Feb. 16, 1943 |
| 2,345,462 | Coughlin | Mar. 28, 1944 |
| 2,648,893 | Begle | Aug. 18, 1953 |
| 2,697,866 | Greenleaf | Dec. 28, 1954 |
| 2,737,705 | Novkov | Mar. 13, 1956 |